United States Patent [19]

Hubbard et al.

[11] Patent Number: 5,069,923
[45] Date of Patent: Dec. 3, 1991

[54] APPARATUS AND PROCESS FOR EXPANDING RAW AMARANTH

[75] Inventors: Edward S. Hubbard, Wells; Terry J. Guanella, Bricelyn, both of Minn.

[73] Assignee: American Amaranth, Inc., Bricelyn, Minn.

[21] Appl. No.: 583,146

[22] Filed: Sep. 17, 1990

[51] Int. Cl.⁵ .............................................. A23L 1/00
[52] U.S. Cl. .................................. 426/445; 99/323.9; 99/323.11; 426/450; 426/456
[58] Field of Search ............... 426/445, 450, 456, 469; 99/323.4, 323.5, 323.9, 323.11

[56] References Cited

U.S. PATENT DOCUMENTS

| | | | |
|---|---|---|---|
| 1,946,803 | 2/1934 | McKay | 426/450 |
| 3,095,326 | 6/1963 | Green et al. | 99/323.8 |
| 3,450,539 | 6/1969 | Goode | 426/450 |
| 3,680,473 | 8/1972 | Bedenk et al. | 99/323.11 |
| 3,689,279 | 9/1972 | Bedenk | 426/450 |
| 3,783,820 | 1/1974 | Hautly et al. | 99/323.8 |
| 3,843,814 | 10/1974 | Grunewald-Kirstein | 426/307 |
| 3,961,091 | 6/1976 | Caccavale et al. | 426/309 |
| 4,089,984 | 5/1978 | Gilbertson | 426/305 |
| 4,096,281 | 6/1978 | Young et al. | 426/309 |
| 4,512,247 | 4/1985 | Friedman | 99/323.5 |
| 4,767,635 | 8/1988 | Merritt et al. | 426/460 |

Primary Examiner—George Yeung
Attorney, Agent, or Firm—Haugen and Nikolai

[57] ABSTRACT

An apparatus and process are disclosed for expanding raw, wholeseed amaranth and extruded half products of cereal grains. Amaranth (for example), after tempering to a predetermined moisture content, is fed at a steady rate to a cylindrical popping drum having perforations sufficiently small to contain both raw and expanded amaranth. Popping is accomplished with air heated to a temperature of from 450 to 500 degrees F., forced into the popping drum from below to provide a fluid bed for supporting the amaranth. An auger in the popping container is rotated to move the amaranth through the container as it is being popped, further agitating the amaranth. Following expansion, the expanded amaranth is separated from unexpanded amaranth and other unwanted matter, either in a perforated, revolving separating drum, or on an inclined, vibrating screen.

19 Claims, 3 Drawing Sheets

APPARATUS AND PROCESS FOR EXPANDING RAW AMARANTH

BACKGROUND OF THE INVENTION

The present invention relates to processing grains, and more particularly to a means for expanding raw, wholeseed amaranth and extruded half products of cereal grains such as corn, wheat and oats.

Amaranth is a pseudo grain in the nature of buckwheat, used for many years in certain regions of Asia and South America. Just recently introduced into the United States, amaranth is rapidly gaining acceptance, particularly among consumers interested in health and the nutritional value of food products. In particular, amaranth is high in protein content, whereby amaranth flour can be combined with wheat flour to provide enriched flours and pancake mixes. While not a true cereal grain, amaranth is used in cereal products as well.

Another amaranth product is based upon the fact that amaranth, in the raw, wholeseed form, includes entrapped moisture. Upon a sufficiently rapid heating, the moisture expands the seed. This puffs or pops the amaranth, much in the same manner as popping corn is expanded or popped. Popped or puffed amaranth is generally spherical and about one-eighth of an inch in diameter, approximately six times (or more) the size of the raw, unpopped grain. Accordingly, puffed amaranth tends to be used as a filler to add nutrition to certain baked goods, to garnish salads, and the like. The conventional approach to popping amaranth is on a small batch basis, e.g. stove-top popping with oil, in a frying pan or the like. This must be done with care, as there is a narrow range of tolerance between insufficient heating of the amaranth to achieve popping, and excessive heating leading to charring or burning.

In recent years, concern about the greasy texture and calorie content of popcorn prepared using fats or oils, has increased the popularity of hot air corn poppers. U.S. Pat. No. 4,767,635 (Merritt et al) discloses a method for flavoring popping corn, including mixing unpopped corn with an aqueous coating mixture consisting essentially of an edible adhesive, and a flavoring such as an edible salt or other flavorant. The edible adhesive can include proteinaceous adhesives such as gelatin, alginates such as propylene glycol alginate, pectin, gums and gum arabic. The mixture is then dried to a moisture content of about 11-14 percent by weight. Thus treated, the mixture is said to retain substantially all of the added flavor upon being popped in a hot air popper.

Other foods suitable for puffing or expanding include extruded flours of amaranth and cereal grains such as corn, wheat and oats. Frequently, such products are puffed or popped by deep-fat frying, again raising concerns about the calorie content.

Alternatives to deep-fat frying are known in connection with various grain based food products. For example, U.S. Pat. No. 3,689,279 (Bedenk) discloses a high protein ready-to-eat breakfast cereal, made from a dough which is formed by combining gelatinized cereal grain (preferably corn, but also possibly wheat, oats or rice) with partially hydrolyzed soy isolate. The resultant dough is processed through an extruder into strands, which are sliced to form pellets. Following tempering to a moisture content of 12-14 percent, the pieces of dough are puffed, for example, by a process of heating under pressure followed by rapid release of the pressure.

In U.S. Pat. No. 1,946,803 (McKay), a mixture of rice and a solution of sugar, salt and water is cooked, cooled and dried, ground to small particles and tempered for uniformity in moisture content, rolled into ribbons, dried, broken into fragments and finally toasted and puffed in a rotary toaster at a temperature of 450-600 degrees F.

While the above and many other processes have proven satisfactory in connection with certain foods, these approaches do not adequately address the need for low cost, reliable approach for expanding amaranth and grain half products.

Therefore, it is an object of the present invention to provide an efficient means for a large scale production of popped amaranth and grain half products;

another object is to provide a means of expanding amaranth and half products of certain grains in a manner which results in a more nutritious food product;

yet another object is to provide an improved process for popping raw, wholeseed amaranth, resulting in a more consistent product available at lower cost.

SUMMARY OF THE INVENTION

To achieve these and other objects, there is provided an apparatus for expanding amaranth and half products of cereal grains. The apparatus includes a first container for receiving and tempering raw, wholeseed amaranth. A second container is provided for the amaranth, having a wall defining a chamber for the amaranth, with multiple perforations through the wall. The perforations are substantially uniform in size and sufficiently small to substantially prevent passage of raw amaranth therethrough. A first transfer means is provided for moving the amaranth from the first container to the second container at a uniform rate. An agitation means is provided in the second container for agitating amaranth contained in the chamber. Means are provided for heating air to a temperature sufficient for popping the raw amaranth, and for supplying the heated air to the chamber through the perforations, thus to expand at least a substantial portion of the raw amaranth contained in the chamber. Finally, a separating means receives an output of the second container, and separates the expanded amaranth from raw, unpopped amaranth and other matter.

Preferably the second container is a cylindrical drum having a cylindrical wall formed largely of a 28 mesh screen. This screen forms a highly porous wall, yet with openings sufficiently small to retain both popped and unpopped amaranth within the chamber. The preferred agitation means is an auger, which, when rotated, moves the amaranth at a steady rate from the input end to the output end of the cylindrical drum.

The heated air which expands the amaranth is supplied to the chamber from below, and should be supplied with sufficient force so that the amaranth tends to be carried on a bed of air, rather than coming to rest on the bottom portion of the cylinder wall. This enhances the mixing action, as well as preventing lodging of material where it might burn or possibly jam the auger.

The preferred transfer means is a motor driven paddle wheel. The feed rate of tempered raw amaranth into the second container is thus controlled by adjusting the speed of the paddle wheel drive motor, enabling precise control of the feed rate.

One suitable separating means is a cylindrical drum with walls formed of a 12 mesh screen. The 12 mesh screen provides openings sufficiently large for passage of raw, unpopped amaranth while retaining the expanded product. The separator drum is rotated to facilitate separation and removal of the raw amaranth, which is collected in a bin below the drum.

Alternatively, a particularly effective separation means employs an inclined, flat 28 mesh screen which is vibrated as it supports the output from the chamber. As the screen vibrates, puffed amaranth tends to ride downwardly toward one end of the screen. Conversely, unpuffed amaranth and other material of similar density tends to ride upwardly, to the opposite end of the screen. A jet of air can be directed upwardly through the screen, to cool the amaranth, and to carry dust and other light particulate matter upwardly away from the puffed amaranth. The result is a particularly clean, uniform expanded amaranth product.

Another aspect of the present invention is a process for expanding raw, wholeseed amaranth grain. The process includes the following steps:

tempering raw, wholeseed amaranth to a substantially uniform moisture content in the range of from 15–17 percent;

agitating the tempered amaranth in a porous container, and simultaneously directing a stream of heated air onto the amaranth from outside of and beneath the container, thus to form a fluid bed supporting the amaranth as the heated air pops the amaranth; and following popping, separating the popped amaranth from the unpopped amaranth and other matter.

The preferred moisture content after tempering is 16 percent by weight, with the tempered raw amaranth being fed to the container at a uniform rate, then moved through the container by a rotating auger as it is popped, and agitated by the combined action of the auger and the forced, heated air.

For satisfactory popping of the amaranth, the forced air providing the bed is heated to a temperature in the range of from 400–600 degrees F., and more preferably in the range of from 450–500 degrees F. By controlling the temperature, the feed rate and the moisture content of the raw amaranth after tempering, a consistently high quality puffed amaranth product is achieved on a large scale and at relatively low cost, facilitating the use of puffed amaranth as a food additive. As popping is accomplished without oils or fats, the calorie content of the amaranth or half product is minimized, further enhancing its value as a nutrition-enhancing food additive.

IN THE DRAWINGS

For a further appreciation of the above and other features and advantages, reference is made to the following detailed description and to the drawings, in which.

DETAILED DESCRIPTION OF THE PREFERRED EMBODIMENTS

Figure 1:
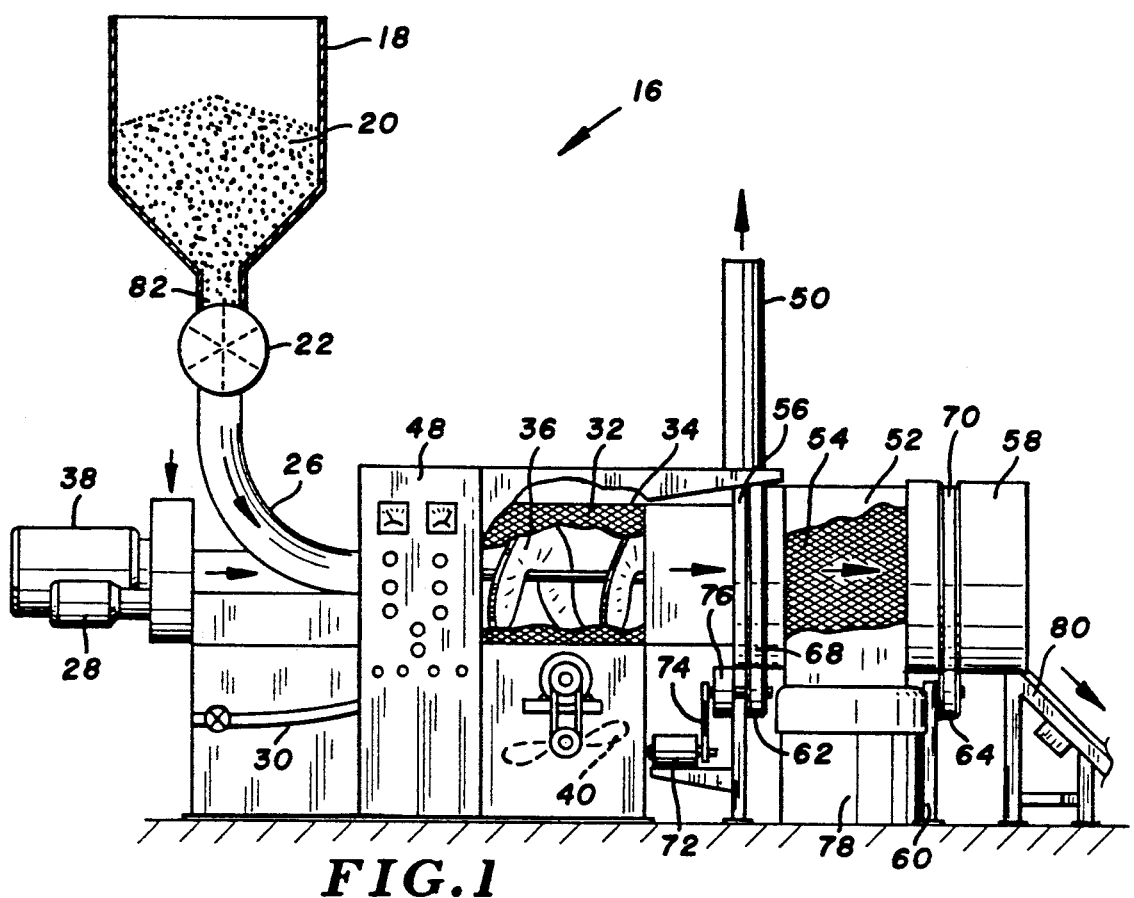
FIG. 1 is a side elevational view of an apparatus for expanding raw, wholeseed amaranth and extruded cereal grain half products in accordance with the present invention.

Turning now to the drawings, there is shown in FIG. 1 an apparatus 16 for expanding raw, wholeseed amaranth and half products of grains, formed by extruding flours of the grains. The apparatus includes an input stage at which the product is collected and then fed at a controlled rate, an expansion stage at which the product is puffed or popped, and a separator stage at which the expanded product is separated from other matter, e.g. unpopped product, chaff or hulls.

Considering first the input stage, a hopper 18 is shown substantially filled with raw, wholeseed amaranth as indicated at 20. To maximize popping efficiency, the moisture content of the amaranth is carefully controlled. More particularly, water is combined with the amaranth, and the moisturized amaranth tempered, either in hopper 18 or in a separate container (not shown), to bring the moisture level to 16 percent by weight, although moisture levels in the range of 14–18 percent are satisfactory, the optimum depending on the grain variety. A metering device 22, operated by variable speed motor 24 (FIG. 2), permits amaranth to be supplied at a controlled rate to the expansion stage through a conduit 26.

Further inputs to the expansion stage include combustion air, supplied by a fan (not shown) driven by a combustion air fan motor 28, and natural gas or other appropriate fuel, supplied over a line 30. The combustion air and fuel are supplied to a burner (not shown) which heats air for popping the amaranth.

The expansion stage includes a cylindrical, horizontally disposed popping drum 32. A cylindrical wall 34 of the drum is formed principally of a 28 mesh screen. Consequently drum 32 is highly porous and readily admits forced air into a cylindrical popping chamber defined by the drum. At the same time, individual openings are sufficiently small to prevent passage of unpopped amaranth seeds through wall 34.

Inside drum 32 is an auger 36, rotated on the horizontal drum axis by an auger drive motor 38, thus to continually urge amaranth through drum 32 as it is being popped, from left to right as viewed in FIG. 1. As it moves the amaranth, auger 36 tends to agitate and mix the amaranth, to enhance popping action.

The amaranth is expanded by heated, forced air, supplied from beneath popping drum 32 by a fan 40. Fan 40 is mounted to rotate with a shaft 42, the shaft in turn being rotated by a popping air fan motor 44 through a belt 46.

The apparatus includes a control panel 48 with means for adjusting the speed of motor 24 to control the amaranth feed rate, for controlling auger motor 38 to control the auger speed, and for controlling the flow of natural gas and combustion air to adjustably control the temperature of the popping air supplied by fan 40. The temperature of the popping air is controlled to within the range of 300–550 degrees F. More preferably, the air temperature is in the range of from 450–500 degrees F. Generally, popping near 300 degrees F. enhances shape retention, while popping at higher temperatures more effectively denatures enzymes and thus increasing product shelf life. Further, fan 40 drives the popping air upwardly into drum 32 with sufficient force to provide a fluid bed which supports the amaranth as auger 36 moves it through the drum. This prevents any jamming or packing of the amaranth within the drum, and the air stream cooperates with auger 36 to further mix and agitate the amaranth, for maximum popping efficiency. The porosity of wall 34 thus enhances both the heating and agitation of the amaranth.

The heating air exits the expansion stage at an exhaust column 50. Shown at relatively short for convenience, exhaust column 50 preferably extends through a roof or wall of a building in which the apparatus is housed, or to a collection means for dust or other light weight particulates carried from popping drum 32 by the popping air.

At the separation stage is a cylindrical, horizontally disposed separator drum 52. A porous wall 54 of the separator drum is formed of a 12 mesh screen secured between opposite end portions 56 and 58.

Figure 2:
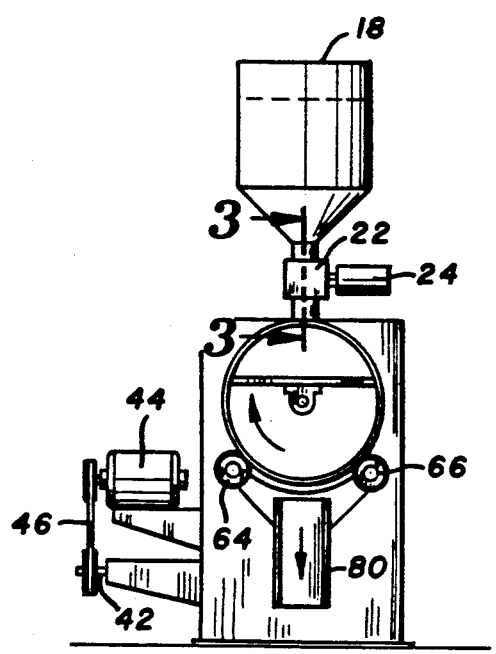
FIG. 2 is a rearward end elevation of the apparatus.

Separator drum 52 is supported on a frame 60 by four rollers, three of which are shown at 62, 64 and 66 (FIG. 2). The separator drum is maintained on the rollers by tracking grooves 68 and 70 on the opposite end portions of the drum. Roller 62 is a drive roller, operated by a separator drum motor 72 through a drive belt 74 and a gear box 76. The remaining rollers are idlers. Drum 52 tumbles and mixes the puffed amaranth, which increases its exposure to ambient air to enhance cooling after popping. Further, unpopped amaranth and other particles sufficiently small to pass through the 12 gauge screen, are more readily separated from the puffed amaranth during tumbling, and are collected beneath drum 52 in a bin 78. From separator drum 52, the puffed amaranth moves to a ramp 80, from where it is collected for either bulk or individual packaging. As a safety measure, a magnet is mounted immediately beneath the ramp to remove any ferrous material from the product stream.

Figure 3:
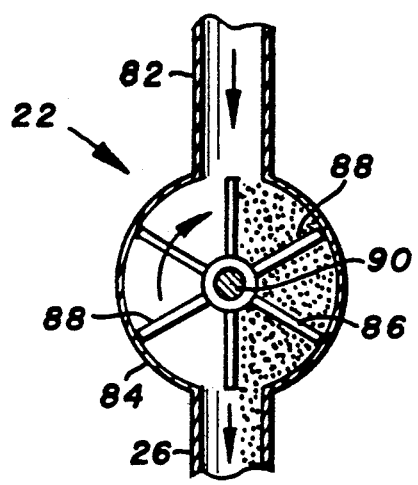
FIG. 3 is an enlarged view of a feed rate controlling device used in the apparatus.

As previously mentioned, among the factors critical for maximum puffing efficiency are the moisture content of the amaranth just prior to its expansion, the rate at which auger 36 drives the amaranth through popping drum 32, and the rate at which raw amaranth is fed to the popping drum. To control this latter factor, metering device 22 is provided just downstream of an output neck 82 of hopper 18. The metering device includes a cylindrical housing 84 open to the neck and to downstream conduit 26, and a paddle assembly 86 mounted for rotation within the housing, clockwise as viewed in FIG. 3.

Paddle assembly 86 includes six substantially identical paddles 88, each extended radially outward of a central shaft 90 and terminating proximate the inside wall of housing 84, thus to prevent the free fall of amaranth from hopper 18 to conduit 26. The amaranth flow rate is controlled by controlling the rotational speed of the shaft and paddles, through feed motor 24. A rate of about three to six pounds per minute has been found satisfactory as the feed rate. The combination of feed rate and speed of auger 36 determines the residence time for amaranth or other product inside of drum 32. The speed of the auger is not closely dependent upon the feed rate, but rather can be increased and decreased relative to a given feed rate, to respectively reduce or increase the residence time. The preferred range for operating the auger is at a speed in the range of from thirty-one to forty-eight rpm. This provides some flexibility in setting the residence time in the drum, which preferably is within the range of from fourteen to twenty-two seconds.

The approach to expanding extruded half products of cereal grains is substantially similar, occurring within the same 300–550 degrees F. temperature range. The range of preferred feed rates and auger speeds is the same. However, moisture in the half products is controlled in a dryer, following their extrusion. Further, another feeding device is used instead of metering device 22. One example of an alternative feeding approach includes a surge bin 87 feeding product to a vibratory feeder 89 including a trough 91 vibrated by a motor 93.

While apparatus 16 has proven satisfactory, there frequently arises a need for a more complete separation of popped amaranth from other matter, beyond the separation afforded by separator drum 52. In particular, husks and other debris of a size comparable to the puffed amaranth or larger, is a retained in drum 52 along with the puffed amaranth. Further, dust and other fine particulates remain, despite the fact that at least some of this material is carried to exhaust column 50 with the heated air stream that pops the amaranth.

For substantially improved separation, and in accordance with a second embodiment of the invention, a vibrating separator 92 is provided in lieu of separator drum 52.

Figure 4:
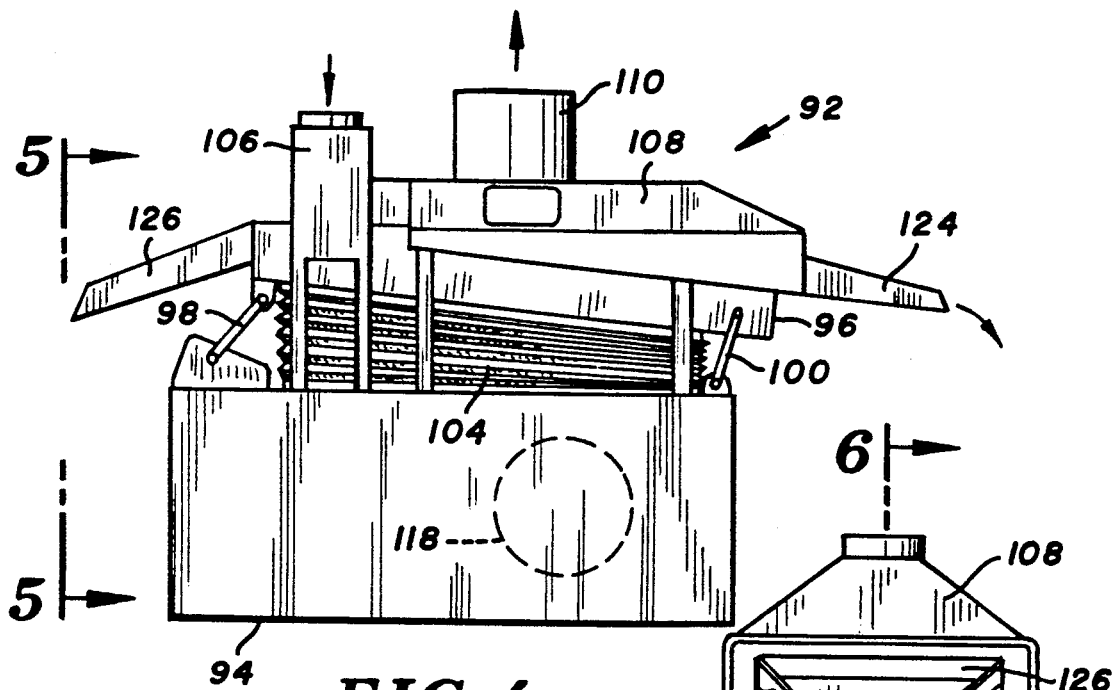
FIG. 4 is a side elevation of a separating device employed as an alternative to the separating drum shown in FIGS. 1 and 2.
Figure 5:
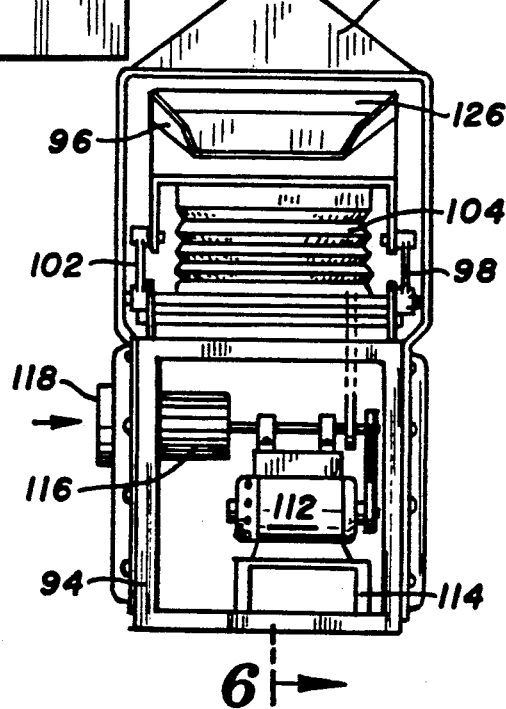
FIG. 5 is a end elevation of the separating device.
Figure 6:
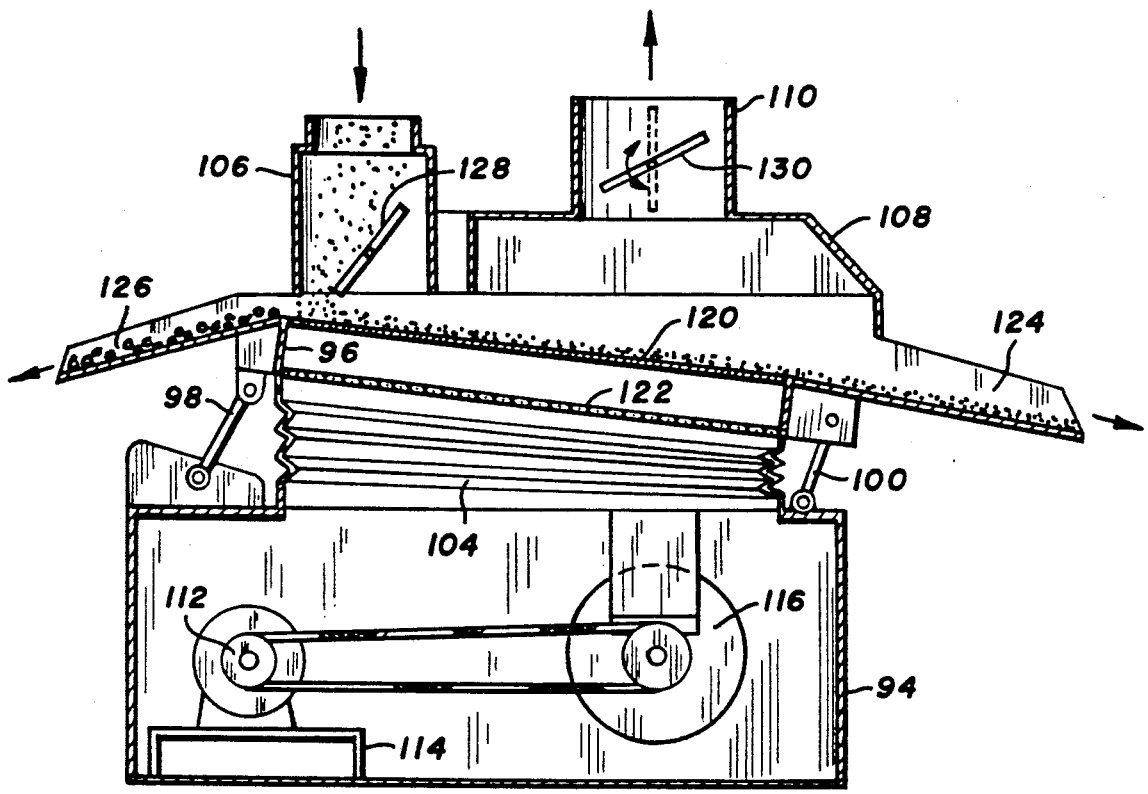
FIG. 6 is a sectional view taken along the line 6—6 in FIG. 5.
Figure 7:
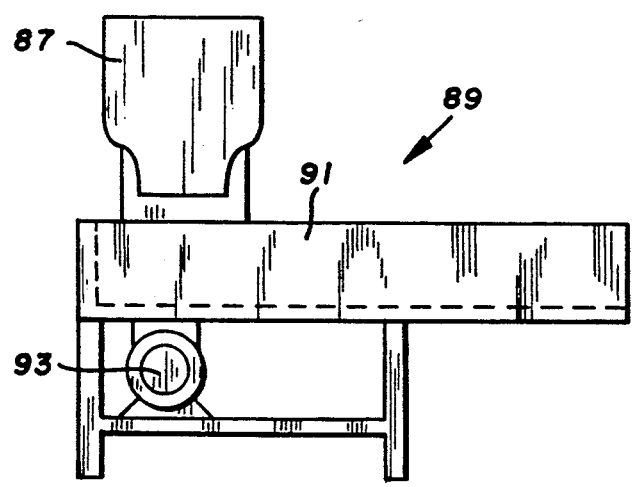
FIG. 7 illustrates a alternative feeding device for use with grain half products.

As seen in FIGS. 4–6, the vibrating separator has a stationary main frame or base 94, and an inclined frame 96 mounted to the base through four struts, three of which are shown at 98, 100 and 102. The struts are mounted pivotally to base 94 and frame 96, and thus permit the inclined frame to oscillate relative to the base. A shroud 104 of canvas or other suitable pliable material is fastened to base 94 and to inclined frame 96, and is positioned between them.

Puffed amaranth from popping drum 32 is loaded onto incline frame 96 through an intake plenum 106, open at the top to receive the grain. A hood 108 is positioned over the majority of the inclined frame. The hood is open to an exhaust stack 110 on top of the hood, for carrying away forced air, directed onto inclined frame 96 from beneath.

In FIG. 5, an end wall of main frame 94 is removed to reveal a motor 112 mounted on a support 114. Motor 112 moves the struts through a drive linkage to vibrate inclined frame 96, and simultaneously rotates a fan 116 which draws air inwardly through an air intake 118, and forces the air vertically upward toward inclined frame 96.

As seen in FIG. 6, inclined frame 96 supports an upper screen 120 and a lower screen 122 in parallel, spaced apart relation in the direction of incline of the frame. Upper screen 120 is relatively fine, preferably 28 mesh, to support both raw and puffed amaranth and prevent either material from falling downwardly through the screen. Lower screen 122 is intended to provide structural support while facilitating the upward passage of forced air through both screens, and accordingly is preferably a coarse mesh. Material exits inclined frame 96 by one of two ramps at opposite ends of the frame, a product ramp 124 which extends substantially parallel to the incline of the frame, and a waste material ramp 126 inclined oppositely to the frame.

For controlling the rate at which amaranth is supplied to the inclined frame, a feed control baffle 128 is mounted in intake plenum 106, and is rotatable on a horizontal axis to either widen or constrict the passage through the plenum, as desired. Similarly, an air control baffle 130 in exhaust stack 110 is rotatable to control the flow of air upwardly out of the exhaust stack.

Vibrating separator 92 is particularly effective in separating popped amaranth from the unpopped grain, as well as from husks, dust and other matter. In contrast to separator drum 52, which separates puffed and unpuffed amaranth based on the difference in size, vibrator separator 92 separates these materials based on differences in their density. More particularly, as frame 96 vibrates, the relatively dense or heavy materials such as unpopped amaranth tend to climb or migrate up the incline, or from right to left as viewed in FIG. 6. The popped amaranth, however, is less dense, and tends to travel to the right or down the incline in response to frame vibration. Thus, certain foreign materials such as husks are separated from the puffed amaranth, even if they are larger in size than the puffed amaranth, provided their density is sufficiently greater. The separation of such larger particles substantially improves the product quality.

Product purity is further enhanced by the air forced through screens 120 and 122 by fan 116. The upward air stream removes dust and other fine particulates, carrying them into exhaust stack 110 as part of the air stream. Such particulates otherwise would either fall through screens 120 and 122, or remain with the puffed amaranth. Separation of the puffed amaranth is further enhanced, since the air stream removes certain larger particles and pieces as well, provided they are sufficiently low in density to be carried upwardly by the air stream. Yet another benefit of the air stream is that it rapidly cools the popped amaranth so that (in contrast to amaranth immediately existing separator drum 52) it can be immediately packaged or otherwise handled.

Thus, in accordance with the present invention, amaranth and half products of cereal grains can be expanded on a large scale, at relatively low cost, to yield a product of consistent, repeatably high quality. Separation of unwanted materials such as unpopped amaranth, husks, dust and the like is particularly effective when the vibrator separator is employed, with the additional advantage of rapid cooling of the puffed amaranth. The rapid cooling reduces the amount of time the amaranth or extruded half product remains at temperatures sufficiently high to promote bacteria growth. The amaranth or other products are expanded entirely with heated forced air, eliminating the use of fats or oils and thus reducing calories, to enhance the nutritional value of the product. The nutritional value further is enhanced in that the heat denatures certain enzymes that otherwise cause rancidity of the oil in the grain.

What is claimed is:

1. An apparatus for expanding amaranth and half products of cereal grains, including:
   a first container for receiving a food product suitable for expanding, said food product including one of the following: raw, wholeseed amaranth and extruded half products of cereal grains;
   a second container having a wall defining a chamber for the food product, said wall having multiple perforations therethrough, substantially uniform in size, and sufficiently small to prevent passage of the unexpanded food product therethrough;
   a transfer means for moving the food product from the first container to the second container at a uniform feed rate;
   an agitation means in the second container for agitating the food product contained in the chamber;
   a means outside of and proximate the second container for supplying heated air to the chamber through the perforations, to expand the product as it is being agitated in the chamber; and
   a separating means, receiving the output of the second container following the expanding, for separating the expanded food product from the unexpanded product and other matter.

2. The apparatus of claim 1 wherein:
   said transfer means includes a conduit from the first container to the second container, a cylindrical housing formed in the conduit and open to upstream and downstream portions of the conduit, a paddle assembly rotatable on a shaft mounted inside the housing and including a plurality of paddles, each paddle extended radially of the shaft to a point proximate the housing wall, and a motor operably connected to the shaft for rotating the paddle assembly at a controlled rate.

3. The apparatus of claim 2 wherein:
   said second container and chamber are cylindrical, and the agitation means is an auger axially aligned with and rotatable with respect to the second container.

4. The apparatus of claim 3 further including:
   a variable speed auger motor operably connected to the auger for rotating the auger at a controlled and variable rate of rotation.

5. The apparatus of claim 3 wherein:
   said means for supplying heated air to the chamber includes a fan positioned below the second container for forcing air upwardly into the chamber.

6. The apparatus of claim 5 wherein:
   said fan drives the heated air upwardly with sufficient force to provide a fluid bed for supporting the food product as it is expanded by the heated air.

7. The apparatus of claim 1 wherein:
   said separating means comprises a cylindrical drum having a perforated separator wall with openings through the separator wall sufficiently large to permit passage therethrough of unexpanded food product, but sufficiently small to retain the expanded food product, a means for revolving the separator drum, and a means beneath the drum for collecting matter passing through the separator wall and thereby separated from the expanded food product.

8. The apparatus of claim 1 wherein:
   said separating means includes an inclined, vibrating screen having a mesh size sufficiently small to prevent passage of the expanded and unexpanded food product, and a means for vibrating the screen.

9. The apparatus of claim 8 wherein:
   said separator further includes a means for forcing air at ambient temperature upwardly through the screen.

10. A process for expanding raw, wholeseed amaranth grain, including the steps of:
    combining raw, wholeseed amaranth with water, then tempering the mixture until the moisture content is uniform and in the range of from 14 to 18 percent by weight;
    agitating the tempered amaranth in a porous popping container, while simultaneously directing a stream of heated air onto the amaranth from outside of the container, thus to expand the amaranth; and
    separating the expanded amaranth from the unexpanded amaranth and other matter.

11. The process of claim 10 including the further step of:
feeding the tempered amaranth into the porous popping container at a steady, controlled feed rate.

12. The process of claim 11 wherein:
the step of agitating the tempered amaranth includes rotating an auger mounted within the porous popping container, thereby to move the amaranth through the porous container.

13. The process of claim 12 wherein:
the step of agitating further includes providing the heated air from beneath the porous popping container, with sufficient force to support the amaranth on a fluid bed as it is being expanded.

14. The process of claim 10 wherein:
said mixture of amaranth and water is tempered to a moisture content of 16 percent by weight.

15. The process of claim 10 wherein:
the heated air is heated to a temperature in the range of from 400 degrees F. to 600 degrees F.

16. The process of claim 15 wherein:
the heating air is heated to a temperature in the range of from 450 to 500 degrees F.

17. The process of claim 10 wherein:
the step of separating the expanded amaranth includes providing the output of the porous popping container to a porous, cylindrical separation drum, said drum having a perforated separator wall with openings substantially uniform in size, sufficiently large to permit passage of unexpanded amaranth therethrough while being sufficiently small to contain expanded amaranth, and revolving the drum with the amaranth contained therein.

18. The process of claim 10 wherein:
the separating step includes placing the output of the porous container onto an inclined screen, and vibrating the screen, whereby materials having approximately the density of the expanded amaranth migrate downwardly toward a first end of the inclined screen, and particles of at least a second density greater than the density of the expanded amaranth migrate upwardly toward an opposite end of the screen.

19. The process of claim 18 wherein:
the separating step further includes directing forced air, at ambient temperature, upwardly towards the inclined screen, to separate dust and other lightweight material from the expanded amaranth.

* * * * *